United States Patent
Schmid

(10) Patent No.: US 8,087,509 B2
(45) Date of Patent: Jan. 3, 2012

(54) TRANSPORT APPARATUS AND METHOD FOR FEEDING ARTICLES TO A PACKING MACHINE

(75) Inventor: Bernhard Schmid, Neubeuern (DE)

(73) Assignee: Krones AG, Neutraubling (DE)

( * ) Notice: Subject to any disclaimer, the term of this patent is extended or adjusted under 35 U.S.C. 154(b) by 318 days.

(21) Appl. No.: 12/497,740

(22) Filed: Jul. 6, 2009

(65) Prior Publication Data

US 2010/0006396 A1    Jan. 14, 2010

(30) Foreign Application Priority Data

Jul. 8, 2008  (DE) .................... 20 2008 009 166 U

(51) Int. Cl.
*B65G 43/00*    (2006.01)
(52) U.S. Cl. .............. 198/444; 198/460.1; 198/461.1
(58) Field of Classification Search ............ 198/459.8, 198/460.1, 461.3, 461.1, 443, 44, 817
See application file for complete search history.

(56) References Cited

U.S. PATENT DOCUMENTS

| | | | | |
|---|---|---|---|---|
| 4,844,234 A | * | 7/1989 | Born et al. | 198/444 |
| 5,768,860 A | * | 6/1998 | Weaver | 198/444 |
| 6,131,372 A | * | 10/2000 | Pruett | 198/461.3 |
| 6,776,278 B1 | | 8/2004 | Gross et al. | |
| 7,128,217 B2 | * | 10/2006 | Henry | 198/443 |
| 7,207,428 B2 | * | 4/2007 | Huttner | 198/444 |
| 2006/0021852 A1 | | 2/2006 | Cull et al. | |
| 2010/0038210 A1 | * | 2/2010 | Cox et al. | 198/460.1 |

FOREIGN PATENT DOCUMENTS

| | | |
|---|---|---|
| DE | 2745640 | 4/1979 |
| DE | 3840647 | 8/1989 |
| DE | 4213557 | 10/1993 |
| DE | 19530626 | 2/1997 |
| DE | 202005013125 | 11/2005 |
| DE | 102006039086 | 2/2008 |
| EP | 1184310 | 3/2002 |
| WO | 2008/022734 | 2/2008 |

* cited by examiner

*Primary Examiner* — James R Bidwell
(74) *Attorney, Agent, or Firm* — Simpson & Simpson, PLLC

(57) ABSTRACT

An apparatus and a method for feeding articles to a packing machine are disclosed. A conveyor belt is arranged prior to the belt feeder of the packing machine. The conveyor belt has at least two single lanes which are spatially separated from each other. A first sole driving motor allocated to the conveyor belt. A triggering mechanism connects the first driving motor with the single lanes of the conveyor belt so that the single lanes are driveable with different speeds.

12 Claims, 3 Drawing Sheets

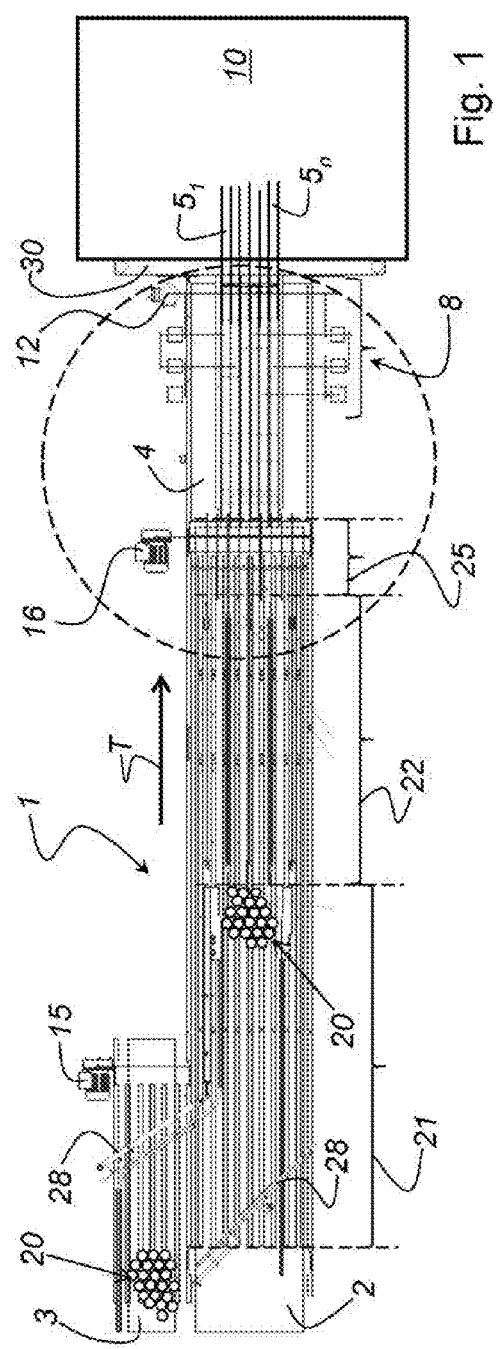
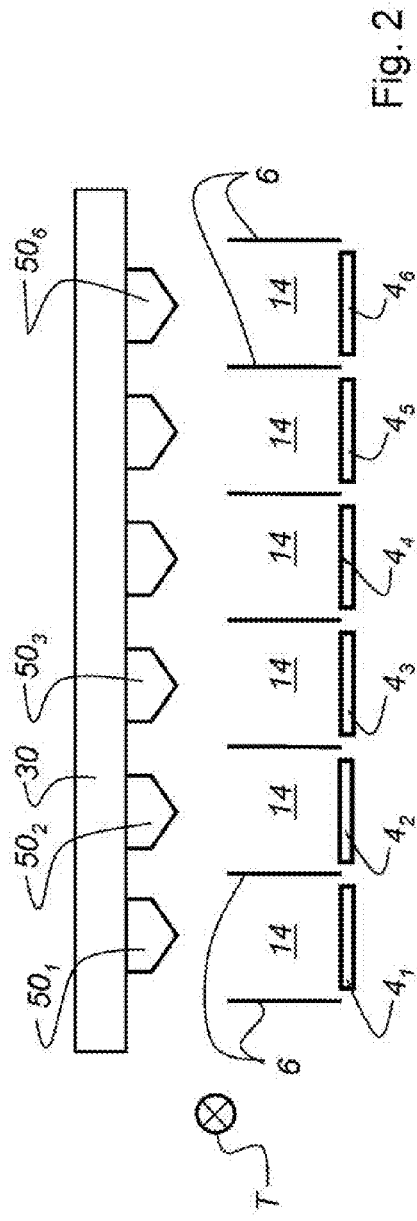
Fig. 1
Fig. 2

TRANSPORT APPARATUS AND METHOD FOR FEEDING ARTICLES TO A PACKING MACHINE

CROSS REFERENCE TO RELATED APPLICATIONS

This patent application claims priority of German Utility Model No. 20 2008 009 166.7, filed on Jul. 8, 2008, the application is incorporated herein by reference.

FIELD OF THE INVENTION

The present invention relates to an apparatus for feeding articles to a packing machine.

The invention relates as well to a method for feeding articles to a packing machine.

BACKGROUND OF THE INVENTION

Such apparatuses are frequently used for the constant allocation of conveyed products or articles onto single lanes of a multilane conveyor belt. The conveyor belt itself forms the infeed to a packing machine or a machine for assembling packs. It can happen that the articles to be transported are not allocated equally in the single lanes of the conveyor belt. In order to achieve equal allocation, the respective single lanes of the conveyor belt are provided with individual driving motors. Therefore, it is possible to drive the single lanes of the conveyor belt differently with speed control so that equal allocation of the articles can be achieved in the lanes.

German Patent DE 38 40 647 discloses an apparatus for transporting printed products. The conveying device conveys the products from a first longitudinal conveying means to two mutually spaced longitudinal conveying means. The space in between the conveying means is bridged by two separately pivotable groups of four conveying elements. Each conveying element is mounted swivellably about a respective vertical shaft mounted at its rear end. These shafts serve simultaneously for driving the conveyor belt, a common driving element in the form of an endless chain being provided for this purpose. The conveying elements have a large swivel area and make it possible for products of different formats to be conveyed.

German Patent DE 10 2006 039 086 discloses a belt feeder. The belt feeder consists of several transport belts, wherein each of said transport belts forms a corporate loop and being endlessly drivable in a circumferential manner. The loops are positioned in such a way that they adjoin one another laterally by the upper length of their loop and form a common horizontal or substantially horizontal transport surface. In order to achieve equal allocation of the products in the single tracks or lanes of a conveyor belt being connected with the belt feeder, a drive with one sole drive motor is provided at the belts of the belt feeder. The transport belts are connected to a drive, wherein said drive is connected to the driving motor and designed as a triggering mechanism in such a way that the speed of at least one transport belt being gradually changeable by switching the drive. The single belts of the transport belt being connected downstream of the belt feeder are driven with one sole motor providing all of the transport belts with the same speed.

German Patent DE 42 13 557 B4 discloses a bottle or can multi-row stream for forming upright standing bottles or cans, wherein said bottles or cans leaving a treatment machine on an outlet conveyor belt in a single row from the discharge starwheel of said treatment machine and are converted into a multi-row flow of low velocity and nearly without gaps. The single row of bottles or cans is led over by a guide element from the outlet conveyor belt onto a conveyor belt being attached to the outlet conveyor belt and running with low velocity, wherein said conveyor belt consists of several conveying sections. Thereby, at least the conveying section which is firstly attached to the outlet conveyor belt is parallel to the outlet conveyor belt. The guide element ranges from the discharge starwheel to the conveying sections, wherein the conveying sections are gradually driven with decreasing velocity.

German utility model DE 20 2005 013 125 U1 discloses a single-lane container flow forming apparatus. Thereby, the multilane container flow is formed into several single lane container rows. The apparatus comprises a conveyor for the container flow, several discharge conveyors for the container rows, an intermediate area which is connected to the conveyor and having several lanes divided by parallel guiding rails each with two tracks. A separating area connects the intermediate area with the discharge conveyor and has several lanes divided by bevel guiding rails. The bevel guiding rails narrow from two lanes to one lane. The lane of the intermediate area has a separate carrier having a variable drive. The variable drive is thereby controllable via a container sensor which is positioned at the respective lane of the intermediate area and/or the separating area.

BRIEF SUMMARY OF THE INVENTION

The object of the invention is to create an apparatus for feeding articles to a packing machine wherein gaps within the transport lanes into the packing machine are being avoided and wherein an optimal back pressure control is possible in the single lanes.

This object is achieved by an apparatus for feeding articles to a packing machine, comprising:
a belt feeder;
a conveyor belt being arranged between the belt feeder and the packing machine, wherein the conveyor belt having at least two single lanes being spatially separated from each other;
a plurality of dividing walls, wherein several lanes for the transport of the articles are formed by the conveyor belt;
a first sole driving motor allocated to the conveyor belt;
a triggering mechanism connects the first driving motor with the single lanes of the conveyor belt so that the single lanes are driveable with different speeds; and
a second sole driving motor, allocated to the belt feeder, wherein said second driving motor drives the entire belt feeder with consistent speed.

It is a further object of the invention to create a method apparatus for feeding articles to a packing machine wherein gaps within the transport lanes into the packing machine are being avoided and wherein an optimal back pressure control is possible in the single lanes.

The above object is achieved by a method for feeding articles to a packing machine comprising the steps of:
transporting the articles with least two single lanes of a conveyor belt to a of a conveyor belt of the packing machine;
driving the conveyor belt of the packing machine with a constant speed;
detecting a distance threshold of the single articles within the single lanes of the conveyor belt; and
adjusting the speed of this single lane at which the distance threshold exceeds a predetermined boundary by shifting a coupling able at the belt, so that this single lane of the conveyor belt is movable faster than the corresponding single lane of the conveyor belt of the packing machine.

It has turned out to be advantageous when the conveyor belt connected downstream of the belt feeder is provided with one sole driving motor. The driving motor is connected with a triggering mechanism, with which the single lanes of the conveyor belt are driven with different speed. Likewise, one sole driving motor is allocated to the belt feeder and driving the entire belt feeder with consistent speed. In an embodiment, the triggering mechanism can be designed as a drive via which the single lanes of the conveyor belt can be driven with different speed if necessary. In other embodiments, the triggering mechanism is designed as a coupling system via which the single lanes of the conveyor belt are combinable with different shafts of the driving motor if necessary.

A further conveyor belt is connected upstream of the belt feeder and supplying the belt feeder with the articles in the mass flow. Likewise, the further conveyor belt is drivable via one sole driving motor. The mass flow of articles on the further conveyor belt and at least on the first section of the belt feeder has a sphere packing. The term 'sphere packing' is to be understand in such a way that the single articles transported in the mass flow are arranged relative to the hexagonal-closepack on the conveyor belt connected upstream of the belt feeder and on the at least first section of the belt feeder respectively.

For breaking open the mass flow, which is being supplied by the conveyor belt connected upstream of the belt feeder, several separating elements are provided on a second section of the belt feeder. Thereby, the separating elements are arranged in such a way that the mass flow of articles is split in single groups of articles.

At one end of the belt feeder, which is opposite of the downstream conveyor belt, also several dividing walls are provided. Several lane sections are formed at the end of the belt feeder by means of these dividing walls. These lane sections of the belt feeder are aligned with the lanes of the conveyor belt. The articles are separately positioned in the lane sections.

Each single lane of the conveyor belt is provided with a coupling of the drive. The speed of each single lane of the conveyor belt is individually changeable by switching on the respective coupling.

Likewise, a conveyor belt of the packing machine is subordinated to the conveyor belt having the lanes in which the articles are to be transported separately. This conveyor belt has also several lanes, which are aligned with the lanes of the upstream conveyor belt. The conveyor belt of the packing machine is provided with a driving motor with which the conveyor belt of the packing machine is moveable with constant speed.

At least one detection device is provided at a transition from the conveyor belt to the conveyor belt of the packing machine. With the detection device, a distance threshold of the single articles transported in the lanes of the conveyor belt is determinable. The distance threshold is determinable at the transition between the conveyor belt and the conveyor belt in the packing machine. After determination of the exceedance of a certain boundary of the distance threshold, the coupling is shiftable to the lane of the conveyor belt so that said lane can be moved faster. The lane of the conveyor belt, at which the coupling is shiftable, moves faster than the corresponding lane of the conveyor belt of the packing machine. Thereby, the distance between the articles is finally reduced in the packing machine. Thus it is possible to adjust the designated distance between the articles intended for the following packing of the single articles and groups of articles respectively.

The detection device comprises several light sensors which are allocated with respect to the single lanes of the conveyor belt at the transition. The light sensors determine the distance threshold between the single articles on the single lanes and single lanes of the conveyor belt of the packing machine respectively.

The method for feeding articles to a packing machine comprises a step of transporting the articles with least two single lanes of a conveyor belt to a of a conveyor belt of the packing machine. The conveyor belt of the packing machine is driven with a constant speed. A distance threshold of the single articles is detected within the single lanes of the conveyor belt. The speed of this single lane is adjusted at which the distance threshold exceeds a predetermined boundary. This is done by shifting a coupling at this single lane, so that this single lane of the conveyor belt is movable faster than the corresponding single lane of the conveyor belt of the packing machine.

A single motor is provided to drive conveyor belt and the adjusting the speed of a single lane of the conveyor belt is carried out with an individual coupling of the clutch system, wherein the speed of each single lane of the conveyor belt is changeable individually by switching on the respective coupling.

BRIEF DESCRIPTION OF THE DRAWINGS

In the following, embodiments of the apparatus according to the invention should explain its advantages according to the accompanying figures in greater detail.

FIG. 1 shows a top view onto the apparatus with which a packing machine can be supplied with sorted articles.

FIG. 2 shows a schematic view of the arrangement of a detection device for determining a distance threshold between single articles.

DETAILED DESCRIPTION OF THE INVENTION

Figure 3:
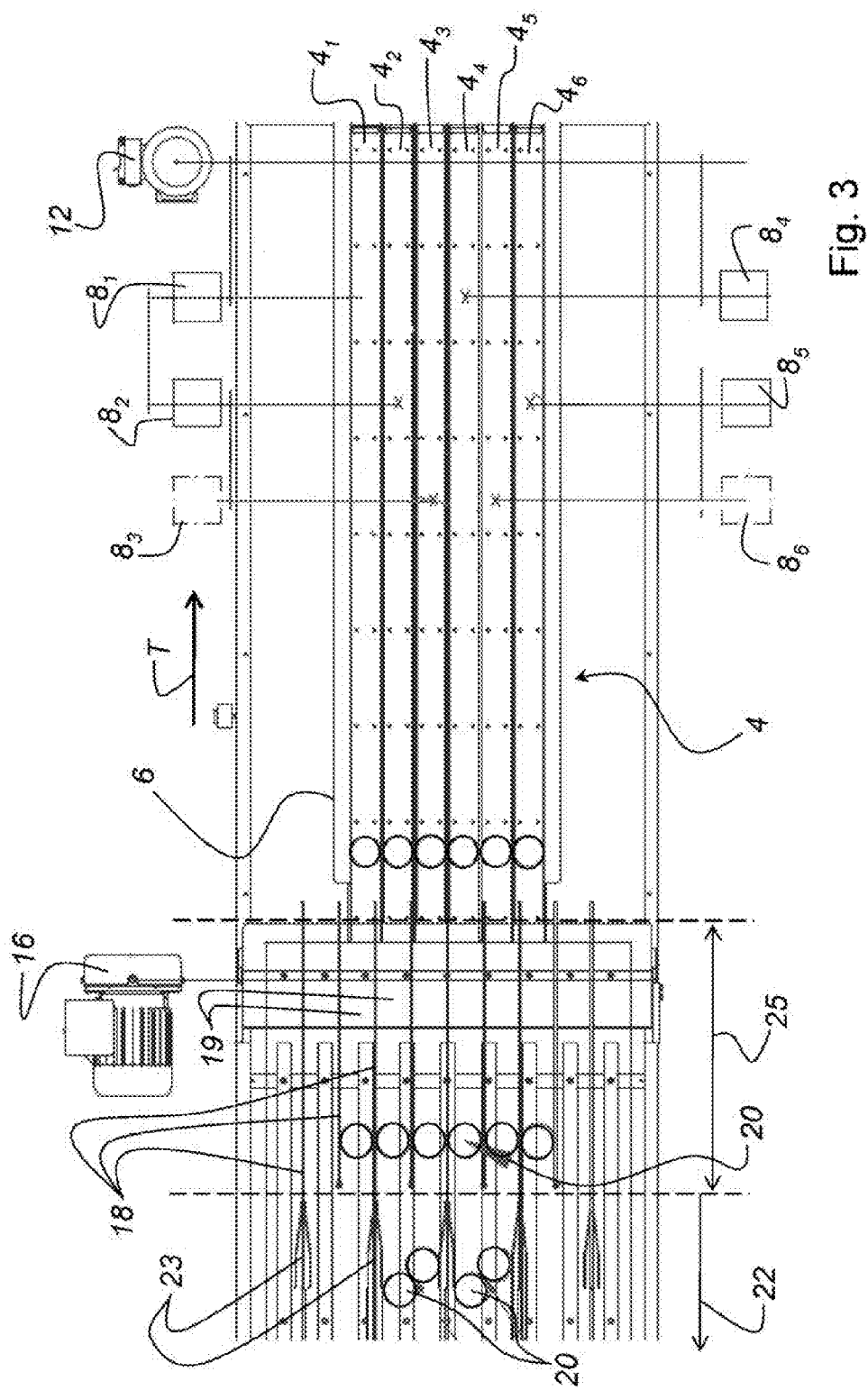
FIG. 3 shows a partial view of the apparatus marked with the dashed circle in FIG. 1.

Same reference numbers refer to same elements throughout the various figures. Furthermore, only reference numbers necessary for the description of the respective figure are shown in the single figures. The shown embodiments represent only examples of how the apparatus according to the invention can be designed. This should not be regarded as limiting the invention.

FIG. 1 shows a top view onto the apparatus according to the invention. In the embodiment shown in FIG. 1, a conveyor belt 4 is connected upstream of a packing machine 10, wherein said conveyor belt 4 consists of several single lanes $4_1, 4_2, \ldots, 4_n$. The single lanes $4_1, 4_2, \ldots, 4_n$ are spatially separated from each other by dividing walls 6 (see FIGS. 2 and 3). Several lanes 14 are formed by these dividing walls 6, wherein the articles 20 can be individually transported and carried to the packing machine 1. A belt feeder 2 is connected upstream of the conveyor belt 4. The belt feeder 2 consists of a first section 21 and a second section 22. The entire belt feeder 2 is connected with one sole driving motor 16, which drives the belt feeder 2 with continuous speed. The belt feeder 2 is designed as a mat conveyor. The incoming articles are transported in a mass flow in the first section 21 of the belt feeder 2. The incoming articles 20 in the mass flow are arranged in the form of sphere packing. With the term 'sphere packing' a packing of articles close to each other is meant. This is generally known as a hexagonal-closepack. Furthermore, a further conveyor belt 3 is connected upstream of the belt feeder 2, which is also drivable with continuous speed via a driving motor 15. The articles in the mass flow are transported via a guiding system 28 from the conveyor belt 3 onto the conveyor belt 2. The conveyor belt 3 is positioned laterally at the belt feeder 2 in the embodiment shown in FIG. 1. The conveyor belt 4 connected upstream of the packing machine is also drivable with one sole driving motor 12. The driving motor 12 is provided with a triggering mechanism 8 or a coupling system. The following description is restricted on the use of a coupling system. This should not be regarded, however, as limiting the invention. Each of the single lanes $4_1$, $4_2, \ldots, 4_n$ of the conveyor belt 4 is connected with a coupling $8_1, 8_2, \ldots, 8_n$. The speed of each lane $4_1, 4_2, \ldots, 4_n$ of the conveyor belt 4 can be individually increased gradually via these couplings. Likewise, several dividing walls 18 (see FIG. 3) having several lane sections 19 are provided at one end 25 of the belt feeder 2, wherein said one end 25 is connected upstream of the conveyor belt 4. These lane sections 19 are aligned with the lanes 14 of the conveyor belt 4. Likewise, individual conveyor lanes $5_1, 5_2, \ldots, 5_n$ are formed in the packing machine 10, which are also aligned with the lanes $4_1$, $4_2, \ldots, 4_n$ of the conveyor belt 4. The transport direction T of the device in FIG. 1 is indicated with an arrow. A detection device 30 is provided at a transition from the conveyor belt 4 in the packing machine 10. Several rails 28 are provided at the transition from the conveyor belt 3 onto the belt feeder 2 for leading the articles. The couplings are freewheeling couplings. In principle, all of the single lanes $4_1, 4_2, \ldots, 4_n$ of the conveyor belt 4 are drivable with the same speed. Thereby, the couplings $8_1, 8_2, \ldots, 8_n$ allocated to the respective lanes $4_1$, $4_2, \ldots, 4_n$ are arranged in a freewheel. The respective coupling is activated as recently as it is necessary to decompose existing gaps between the articles 20 on the single lanes $4_1$, $4_2, \ldots, 4_n$, and the respective lane $4_1, 4_2, \ldots, 4_n$ is thus driven with enhanced speed in order to regulate the gap or also the back pressure of the articles.

An allocation of the detection device 30 to the conveyor belt 4 is schematically shown in FIG. 2. The conveyor belt 4 is also provided with six lanes in the following description. This should not be regarded as limiting the invention. It is obvious for a skilled person that the number of lanes and the width of the lanes respectively are adjustable with respect to the article depending on the articles to be packed and on the size of the article to be packed. The transport direction T shown in the embodiment in FIG. 2 is directed into the plane of projection. The detection device ranges across the conveyor belt 4 and the single lanes $5_1, 5_2, \ldots, 5_n$ of the packing machine 10 respectively. It depends on the structural condition of the apparatus 1 where the detection device 30 is finally exactly positioned. It must be ensured by all means that there is enough time in order to move the conveyor belt 4 or the respective lane $4_1, 4_2, \ldots, 4_n$ of the conveyor belt quickly from the detection of a distance threshold so that the desired distance between the single articles 20 in the packing machine 10 is reached again. The detection device 30 is provided with light sensors $50_1, 50_2, \ldots, 50_n$, determining the distance threshold in the single lanes 14 of the conveyor belt 4. The couplings $8_1, 8_2, \ldots, 8_n$ of the conveyor belt 4 are being operated correspondingly according to the determination of the distance threshold, so that the necessary increased speed is allocable to the respective lane $4_1, 4_2, \ldots, 4_n$, (see FIG. 3 for this).

FIG. 3 shows an enlarged top view of the area marked with the dashed circle in FIG. 1. One sole driving motor 12 is allocated to the conveyor belt 4. The speed of the single lanes $4_1, 4_2, \ldots, 4_n$ of the conveyor belt 4 is adjustable via respective couplings $8_1, 8_2, \ldots, 8_n$. If the respective coupling $8_1, 8_2, \ldots, 8_n$ is switched, then the speed of the respective lane $4_1, 4_2, \ldots, 4_n$ is increased compared with a downstream lane $5_1, 5_2, \ldots 5_n$ of the conveyor belt of the packing machine 10. The single lanes $4_1, 4_2, \ldots, 4_n$ of the conveyor belt 4 are spatially separated from each other by dividing walls 6. Thus, lanes 14 are formed in which the articles 20 are separately transportable. At the end 25 of the belt feeder 2, which is positioned opposite of the conveyor belt 4, respective lane sections 19 are formed which are aligned with the lanes 14 of the conveyor belt 4. The articles 20 are already positioned separately in the lane sections 19 of the belt feeder 2. A second section 22 is connected upstream of the end 25 of the belt feeder 2, in which several separating elements 23 are provided which split the mass flow on the belt feeder 2 into single groups of articles 20. Thus, the articles 20 are positioned separately in the lane sections 19 of the belt feeder.

Figure 4:
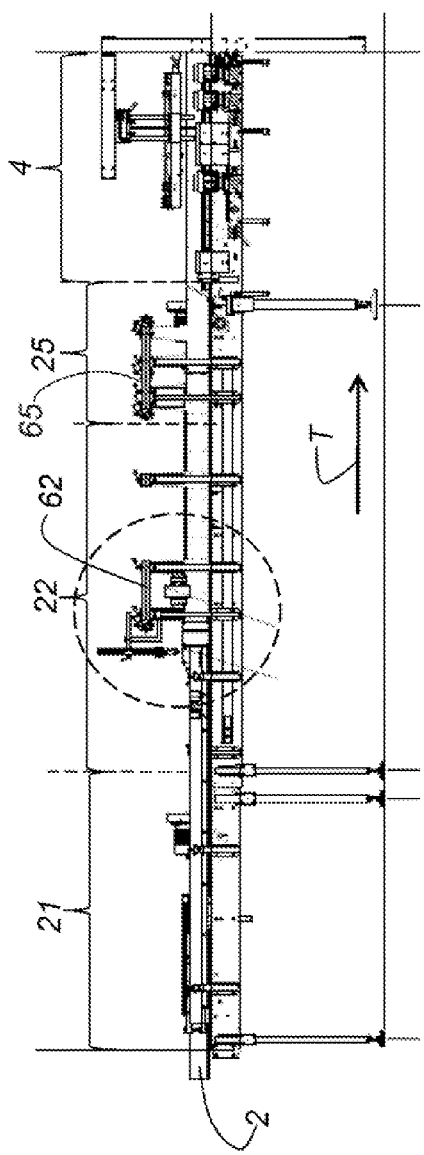
FIG. 4 shows a side view of the apparatus according to the invention.

FIG. 4 shows a lateral view of the apparatus according to the invention. The transport direction T of the articles 20 is indicated with an arrow in FIG. 4. As already mentioned in the description beforehand, the belt feeder 2 is subdivided in a first section 21, a second section 22 and an end 25. The conveyor belt 4 follows the end 25 of the belt feeder 2, wherein said conveyor belt 4 finally transports the articles 20 into the packing machine 10. Likewise, single lanes $5_1$, $5_2, \ldots, 5_n$ are provided in the packing machine 10 carrying the single articles 20 in a respective order to the packing machine for further processing as expressed in the embodiment shown in FIG. 1. A shifting system 62 for the separating elements 23 is provided in the second section 22 of the belt feeder 2. Likewise, a further shifting system 65 is provided at the end 25 of the belt feeder. The separating elements 23 can be adjusted with the shifting system 62 on different types of articles (size, form). The same is possible with the shifting system 65 at the end 25 of the belt feeder 2. The single dividing walls 18 of the lane sections 19 can be here adjusted with respect to different types of the articles. Furthermore, the conveyor belt 4 is connected with a shifting system (not shown), making the dividing walls 14 adjustable in order to enable here as well an adjustment of the single lanes 14 on different types of articles.

Figure 5:
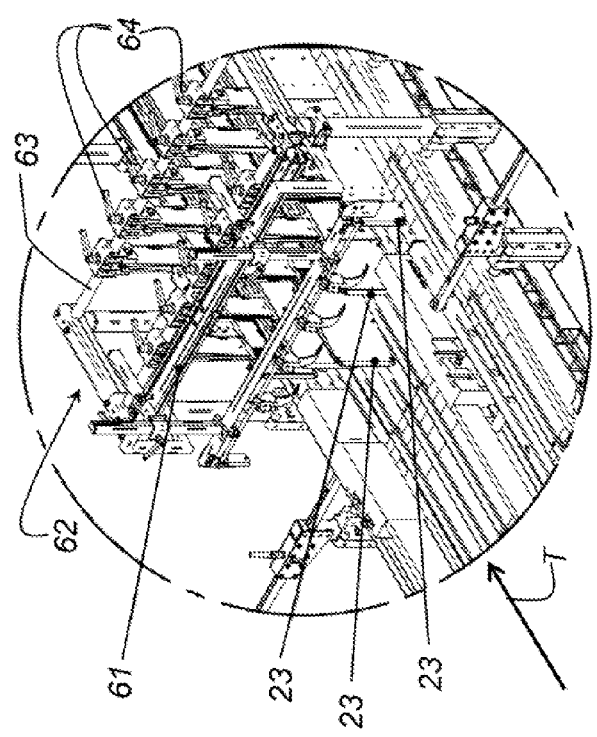
FIG. 5 shows an enlarged perspective view of the area marked with a dashed circle in FIG. 4.

FIG. 5 shows an enlarged embodiment of the area marked with the dashed circle in FIG. 4. A perspective view of the shifting system 62 for the separating elements 23 is basically shown here. The articles 20 are transported in the transport direction T on the belt feeder 2. The articles in the mass flow meet the separating elements 23 in the second section 22, wherein the separating elements 23 are basically shown as plates and barriers respectively. Thus, the compact mass flow can be prized open into single groups. The single separating elements 23 are adjustable via respective rails 61, 63, which are positioned above the separating elements 23. The shifting elements 64 in the embodiment shown in FIG. 5 can be clamped onto the single rails 61. In another embodiment it is also imaginable that this adjustment of the separating elements and also of the dividing walls 18 of the lane sections 19 and the dividing walls 6 of the lanes 14 of the conveyor belt 4 respectively can be adjusted in a motor-driven manner so that quick adjustment on different types of articles and sizes of the articles respectively which should be processed with the apparatus 1 is possible. The articles processed with the apparatus 1 can be bottles, cans, soft packs, etc.

The invention claimed is:

1. Apparatus for feeding articles to a packing machine, comprising:
   a belt feeder;
   a conveyor belt being arranged between the belt feeder and the packing machine, wherein the conveyor belt having at least two single lanes being spatially separated from each other;
   a plurality of dividing walls separating the at least two single lanes for the transport of the articles, wherein the at least two single lanes are formed on the conveyor belt;
   a first sole driving motor allocated to the conveyor belt;
   a triggering mechanism connecting the first driving motor with the single belts of the conveyor belt so that the single lanes are drivable with different speeds; and
   a second sole driving motor, allocated to the belt feeder, wherein said second driving motor drives the entire belt feeder with consistent uniform speed.

2. Apparatus of claim 1, wherein the triggering mechanism is a control gear.

3. Apparatus of claim 1, wherein the triggering mechanism is a clutch system.

4. Apparatus of claim 1, wherein a further conveyor belt is provided upstream of the belt feeder and said further conveyor belt supplies the belt feeder with the articles in a mass flow, wherein the further conveyer belt is drivable via a sole driving motor and the mass flow forms a sphere packing on the further conveyor belt and on at least a first section of the belt feeder.

5. Apparatus of claim 4, wherein in a second section of the belt feeder several separating elements are provided which are arranged in such a way that the mass flow of articles is split into single groups of articles.

6. Apparatus of claim 5, wherein at one end of the belt feeder, which is positioned opposite of the subordinated conveyor belt, also several dividing walls are provided and thus forming several lane sections on the belt feeder, the lane sections being aligned with the lanes of the conveyor belt and wherein the articles in the lane sections being positioned separately.

7. Apparatus of claim 1, wherein each single lane of the conveyor belt is provided with a coupling of the clutch system, with which the speed of each single lane of the conveyor belt is changeable individually by switching on the respective coupling.

8. Apparatus of claim 1, wherein the packing machine comprises a conveyor belt with lanes wherein the conveyor belt of the packing machine is subordinated to the conveyor belt and the lanes being also aligned with the lanes of the conveyor belt and wherein the conveyor belt of the packing machine is provided with a driving motor, with which the conveyor belt of the packing machine is moveable with constant speed.

9. Apparatus of claim 8, wherein at least one detection device is allocated at a transition from the conveyor belt to the conveyor belt of the packing machine, wherein said detection device determines a distance threshold of the single articles on the single lanes of the conveyor belt at the transition and the coupling being shiftable to the single lane, at which the distance threshold exceeds a predetermined boundary, so that this single lane of the conveyor belt is movable faster than the corresponding single lane of conveyor belt of the packing machine.

10. Apparatus of claim 9, wherein the detection device having several light sensors which are allocated to the single lanes of the conveyor belt of the packing machine, with which the distance threshold between single articles on the single lanes of the conveyor belt of the packing machine is determinable.

11. Method for feeding articles to a packing machine comprising the steps of:
    transporting articles with least two single lanes of a conveyor belt to a conveyor belt of the packing machine;
    driving the conveyor belt of the packing machine with a constant speed;
    detecting a distance threshold of the single articles within the single lanes of the conveyor belt; and
    adjusting the speed of this single lane at which the distance threshold exceeds a predetermined boundary by shifting a coupling at this single lane, so that this single lane of the conveyor belt is movable faster than a corresponding single lane of the conveyor belt of the packing machine.

12. Method of claim 11, wherein a single motor is provided to drive the conveyor belt and adjusting the speed of the single lane of the conveyor belt is carried out with an individual coupling of a clutch system, wherein the speed of each single lane of the conveyor belt is changeable individually by switching on the respective coupling.

* * * * *